US007546251B1

(12) United States Patent
Leatherman et al.

(10) Patent No.: US 7,546,251 B1
(45) Date of Patent: *Jun. 9, 2009

(54) INTERNET CAPABLE BROWSER DISPENSER ARCHITECTURE

(75) Inventors: Russel D. Leatherman, Summerfield, NC (US); William C. Royal, Jr., Greensboro, NC (US)

(73) Assignee: Gibarco, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/500,094

(22) Filed: Feb. 8, 2000

Related U.S. Application Data

(62) Division of application No. 08/896,988, filed on Jul. 18, 1997, now Pat. No. 6,052,629.

(51) Int. Cl.
*G06Q 40/00* (2006.01)
(52) U.S. Cl. .......................... 705/26; 705/35
(58) Field of Classification Search ............ 705/16, 705/26, 21, 35; 340/438; 700/241
See application file for complete search history.

(56) References Cited

U.S. PATENT DOCUMENTS

| | | | |
|---|---|---|---|
| 3,345,458 A | 10/1967 | Cole et al. | |
| 3,549,793 A | 12/1970 | Ross et al. | 178/5.4 |
| 3,710,017 A | 1/1973 | Abe et al. | 178/6.8 |
| 3,898,644 A | 8/1975 | Baxter | 340/324 AD |
| 3,936,868 A | 2/1976 | Thorpe | 358/22 |
| 3,949,207 A | 4/1976 | Savary et al. | 235/151.34 |
| 4,001,498 A | 1/1977 | Morishita et al. | 358/160 |
| 4,070,695 A | 1/1978 | Scholz et al. | 358/181 |
| 4,185,300 A | 1/1980 | Miyake et al. | 358/183 |
| 4,218,698 A | 8/1980 | Bart et al. | 358/22 |
| 4,247,899 A | 1/1981 | Schiller et al. | 364/465 |
| 4,395,627 A | 7/1983 | Barker et al. | 235/381 |
| 4,498,098 A | 2/1985 | Stell | 358/22 |
| 4,568,976 A | 2/1986 | Trammell | 358/148 |
| 4,577,229 A | 3/1986 | De La Cierva, Sr. et al. | 358/182 |
| 4,589,069 A | 5/1986 | Endo et al. | 364/405 |
| 4,591,898 A | 5/1986 | DeBoer et al. | 358/36 |
| 4,630,754 A | 12/1986 | Komukai | 222/28 |

(Continued)

OTHER PUBLICATIONS

Fridman, Sherman, Comdex—Cisco's Chambers Sees a Virtual Future Nov. 16, 1999. News Bytes.*

(Continued)

*Primary Examiner*—Thu Thao Havan
(74) *Attorney, Agent, or Firm*—Nelson Mullins Riley & Scarborough LLP

(57) ABSTRACT

The invention relates to an interactive fuel dispenser system having a plurality of fuel dispensers operating in conjunction with a local server. Each dispenser generally has two fueling positions, each with a graphical user interface through which a customer interacts. In contrast with the recent trend in turning fuel dispensers into super computers, applicants' provide a dispenser architecture that need only be sufficient to establish interactivity with a server to create multimedia applications and carry out POS functions with a browser interface. Each fueling position acts as a client of a local server at the fuel station store. In the preferred embodiment, each fueling position client also may access remote servers connected to the same network in which the fueling position clients and the local server are connected. Preferably, this network is or is connected to the Worldwide Web of the Internet.

17 Claims, 3 Drawing Sheets

U.S. PATENT DOCUMENTS

| | | | |
|---|---|---|---|
| 4,631,588 A | 12/1986 | Barnes et al. | 358/149 |
| 4,639,765 A | 1/1987 | Dhont | 358/19 |
| 4,644,401 A | 2/1987 | Gaskins | 358/183 |
| 4,680,622 A | 7/1987 | Barnes et al. | 358/22 |
| 4,750,130 A * | 6/1988 | Shimamura et al. | 364/465 |
| 4,782,401 A | 11/1988 | Faerber et al. | 358/335 |
| 4,843,547 A | 6/1989 | Fuyama et al. | 364/405 |
| 4,967,366 A | 10/1990 | Kaehler | 364/479 |
| 4,999,709 A | 3/1991 | Yamazaki et al. | 358/160 |
| 5,027,211 A | 6/1991 | Robertson | 358/183 |
| 5,027,282 A * | 6/1991 | Hollidge | 700/232 |
| 5,134,716 A * | 7/1992 | Craig | 455/66.1 |
| 5,235,509 A | 8/1993 | Mueller et al. | 364/405 |
| 5,319,545 A | 6/1994 | McGarvey et al. | 364/403 |
| 5,353,219 A | 10/1994 | Mueller et al. | 364/405 |
| 5,394,336 A | 2/1995 | Warn et al. | 364/479 |
| 5,400,253 A | 3/1995 | OConner | 364/442 |
| 5,404,291 A | 4/1995 | Kerr et al. | 364/407 |
| 5,500,890 A | 3/1996 | Rogge et al. | 379/91 |
| 5,535,130 A | 7/1996 | Long | 364/479 |
| 5,543,849 A | 8/1996 | Long | 348/460 |
| 5,557,268 A | 9/1996 | Hughes et al. | 340/933 |
| 5,572,643 A | 11/1996 | Judson | 395/793 |
| 5,581,461 A | 12/1996 | Coll et al. | 395/205 |
| 5,581,749 A | 12/1996 | Hossain et al. | 395/600 |
| 5,583,940 A | 12/1996 | Vidrascu et al. | 380/49 |
| 5,588,060 A | 12/1996 | Aziz | 380/30 |
| 5,590,197 A | 12/1996 | Chen et al. | 380/24 |
| 5,602,745 A | 2/1997 | Atchley et al. | 364/464.23 |
| 5,608,621 A | 3/1997 | Caveney et al. | 395/216 |
| 5,611,051 A | 3/1997 | Pirelli | 395/210 |
| 5,625,562 A | 4/1997 | Veeneman et al. | 364/479.05 |
| 5,659,482 A * | 8/1997 | Warn et al. | 364/479.06 |
| 5,664,110 A * | 9/1997 | Green et al. | 705/26 |
| 5,694,326 A | 12/1997 | Warn et al. | 364/479.01 |
| 5,717,374 A * | 2/1998 | Smith | 340/438 |
| 5,719,779 A | 2/1998 | Shuler et al. | 364/479 |
| 5,719,781 A | 2/1998 | Leatherman et al. | 364/479.02 |
| 5,734,851 A | 3/1998 | Leatherman et al. | 395/329 |
| 5,737,729 A | 4/1998 | Denman | 705/401 |
| 5,761,071 A | 6/1998 | Bernstein et al. | 364/479.07 |
| 5,798,931 A | 8/1998 | Kaehler | 364/479.01 |
| 5,809,298 A | 9/1998 | Nakada | 395/615 |
| 5,812,765 A | 9/1998 | Curtis | 395/200.3 |
| 5,822,215 A | 10/1998 | Hohmann et al. | 364/479.01 |
| 5,826,242 A | 10/1998 | Montulli | 705/27 |
| 5,831,861 A * | 11/1998 | Warn et al. | 364/479.01 |
| 5,831,862 A | 11/1998 | Hetrick et al. | 364/479.02 |
| 5,860,362 A | 1/1999 | Smith | 101/494 |
| 5,895,454 A * | 4/1999 | Harrington | 705/26 |
| 5,895,457 A | 4/1999 | Kurowski et al. | 705/413 |
| 5,905,246 A | 5/1999 | Fajkowski | 235/375 |
| 5,918,214 A | 6/1999 | Perkowski | 705/27 |
| 5,923,572 A | 7/1999 | Pollack | 364/528.17 |
| 5,926,097 A | 7/1999 | Kobayashi et al. | 340/618 |
| 5,933,811 A | 8/1999 | Angles et al. | 705/14 |
| 5,946,665 A * | 8/1999 | Suzuki et al. | 705/26 |
| 5,950,173 A | 9/1999 | Perkowski | 705/26 |
| 5,955,710 A | 9/1999 | DiFranza | 187/396 |
| 5,958,016 A | 9/1999 | Chang et al. | 709/229 |
| 5,969,968 A * | 10/1999 | Pentel | 364/405 |
| 5,970,471 A * | 10/1999 | Hill | 705/26 |
| 5,980,090 A | 11/1999 | Royal, Jr. et al. | 364/479.11 |
| 6,003,008 A * | 12/1999 | Postrel et al. | 705/4 |
| 6,014,636 A * | 1/2000 | Reeder | 705/17 |
| 6,052,629 A * | 4/2000 | Leatherman et al. | 700/241 |
| 6,055,521 A | 4/2000 | Ramsey et al. | 705/413 |
| 6,061,668 A | 5/2000 | Sharrow | 705/400 |
| 6,078,896 A | 6/2000 | Kaehler et al. | 705/14 |
| 6,108,673 A * | 8/2000 | Brandt et al. | 715/236 |
| 6,116,505 A | 9/2000 | Withrow | 235/381 |
| 6,152,591 A | 11/2000 | McCall et al. | 364/479.01 |
| 6,166,734 A * | 12/2000 | Nahi et al. | 715/748 |
| 6,176,421 B1 | 1/2001 | Royal, Jr. et al. | 231/381 |
| 6,275,746 B1 | 8/2001 | Leatherman et al. | 700/234 |
| 6,505,170 B1 * | 1/2003 | Seifert et al. | 705/21 |
| 6,711,474 B1 * | 3/2004 | Treyz et al. | 701/1 |

OTHER PUBLICATIONS

Sliwa, Carol. Sun Targets Browsers Again (Company Business and Marketing). Computerworld. p. 14, Nov. 1998.*

D'Amico, Mary. Networking CEO Predicts e Learning Waves Cisco's 5DHN Chambers Calls Education The Next Hot Growth Area for Internet Applications. Infoworld. vol. 21, # 49, p. 64, Dec. 1999.*

Coming to a Gas Pump Near You. Newsbytes pm. Aug. 1999.*

Tandem Introduces Retail Industry's First Comprehensive Integrated Solution For Operation Of Convenience Stores: "One Stop Shopping" For c— Stores Integrates Best In Class POS, Back Office, And Central Systems On Microsoft Windows NT Server. Business Wire. p. 10211253.*

Microsoft Computer Dictionary, Microsoft Press, p. 497, 1997.*

* cited by examiner

INTERNET CAPABLE BROWSER DISPENSER ARCHITECTURE

RELATED APPLICATIONS

The present application is a divisional of U.S. patent application Ser. No. 08/896,988, filed 18 Jul. 1997, now U.S. Pat. No. 6,052,629.

BACKGROUND OF THE INVENTION

The invention relates generally to fuel dispensers and, more particularly, to fuel dispensers and dispensing systems providing interactive, multimedia functions to a customer. In recent years, fuel dispensers have become more than a means for fueling a vehicle. Service station owners are advertising at the dispenser with everything from simple signs to video displays running commercials. Some service stations have integrated fast-food or quick-serve restaurants, and the dispensers have been converted into complex point-of-sale (POS) systems for ordering food from these restaurants. Additionally, the POS systems facilitate ordering other services, such as car washes, at the gas station. Most modern fuel dispensers include card readers or other payment means allowing payment for not only fuel, but also any products or services ordered at the dispenser.

As the amount of information and number of products and services provided to the consumer increases, dispenser suppliers need economical ways to provide information to the customer and market the fuel company's primary products and services. As the amount of information and number of products and services increase, the number of ways to present such information to the customer increases exponentially. Each oil company and station operator wants to provide information and merchandise to their customers in different ways. Until applicants' invention, these companies and station operators were significantly limited in providing information and marketing goods and services at the dispenser.

A typical fuel dispensing system includes a plurality of fuel dispensers with two fueling positions per dispenser and a central site controller. Sophisticated dispenser systems incorporate expensive, hardware-intensive controllers in each dispenser. Many fueling positions may include a display and touch pad (or screen) to order goods or services. Until now, customer interactivity was limited to choosing an option presented by the dispenser. Unfortunately, changing the various options or presentations for the customer involved changing firmware or downloading new software to each dispenser. With any software application, revisions are necessary and when revisions are made, every dispenser at every desired location must be upgraded.

Although the information age is upon us, modern fuel dispensers have been unable to take full advantage of the tremendous merchandising opportunity presented when a customer is fueling a vehicle. Likewise, customers cannot access useful information during this period. Modern dispensers are unable to provide national advertising and merchandising campaigns or offer information a traveler may want or need during fueling. For example, customers cannot purchase products or services outside the realm of the local station store, such as concert or movie tickets. Valuable information, such as news, weather, traffic updates or customized road maps, is unavailable. Although modern dispensers are highly sophisticated, the cost of providing customized local and remote merchandising, as well as information dissemination, has not been economical.

Prior dispenser technology provided little, if any, integration between advertising and merchandising at the POS. Even in today's most sophisticated systems, advertising is sent to the fuel dispenser from a separate source and often displayed on a separate display than the POS. See Gilbarco's U.S. Pat. Nos. 5,602,745 for Fuel Dispenser Electronics Design, 5,543,849 for Synchronization of Prerecorded Audio/Video Signals with Multimedia Controllers, and U.S. patent application Ser. No. 08/659,304, filed Jun. 6, 1996. Each reference is incorporated herein by reference. The POS simply functions to display order options to the customer, and the customer responds accordingly. The current trend is to increase the computational ability within each dispenser when additional functionality is needed. Although current dispensers are highly sophisticated, the cost to provide each fueling position on each fuel dispenser with the computational horsepower to fully realize multimedia applications outweighed the benefits, and providing customized software for the thousands of stations throughout the world would be very expensive.

Thus, there is a need to provide an economically viable dispenser architecture capable of providing multimedia functions, such as order entry, advertising, merchandising and information dissemination. There is a need for a user-friendly graphical user interface through which a customer can interact to access these functions or services. Furthermore, there is a need, not only for local merchandising and information dissemination, but for remote merchandising and information dissemination from sources that are not directly related to the main service station store to take full advantage of the merchandising potential at the dispenser. There is also a need for an interactive fuel dispenser capable of providing a customer the opportunity to order foods, products and services from the local station store in addition to purchasing products or services, such as movie tickets, or downloading information such as news, weather, traffic updates or road maps from local or remote sites.

SUMMARY OF THE INVENTION

Applicants' fulfill this need by providing an interactive fuel dispenser system having a plurality of fuel dispensers operating in conjunction with a local server. Each dispenser generally has two fueling positions, each with a graphical user interface through which a customer interacts. In contrast with the recent trend in turning fuel dispensers into super computers, applicants provide a dispenser architecture that need only be sufficient to establish interactivity with a server to create multimedia applications and carry out POS functions with a browser interface. Each fueling position acts as a client of a local server at the fuel station store. In the preferred embodiment, each fueling position client also may access remote servers connected to the same network in which the fueling position clients and the local server are connected. Preferably, this network is connected to the Worldwide Web of the Internet.

Each client (fueling position) may include a graphical interface and browser to perform interactive functions at the dispenser. The hardware at the dispenser and fueling position is preferably minimal and only sophisticated enough to establish interactivity with the fueling customer in order to minimize cost. Computer intensive services and functions may be provided at the local server or one of the remote servers. Typically, the browser at each fueling position simply requests services from one of the servers on the network to provide any type of function or service desired at the fueling position. Most notably, applicants' invention is not limited to simple "mass media" marketing with no interaction taking place between the customer and the advertising. The invention actively encourages merchandising at the fueling position. Interactive video/graphic advertising messages provide customers the ability to immediately react to the advertising or merchandising and purchase the products or services advertised, whether local or remote. The dispensers may include card readers at each fueling position to receive payment for the goods or services at the same time payment is made for the fuel.

The invention provides a system for providing interactive video/graphic presentations to a customer and offering the customer selections for services and merchandise as desired. By minimizing the hardware and software commitment at each dispenser and providing services from local and remote servers, an interactive, multimedia system, which is easily updated and economically feasible, is made possible. Providing such remote services is virtually impossible to reproduce within the confines of a service station environment without applicants' invention.

In particular, the invention expands local advertising and its minimalist form of merchandising into an opportunity for sophisticated local and off-site advertising and merchandising ranging from ordering fast food and car washes to purchasing movie tickets or any other product or service desired. Remote products or services may be sent directly to the customers home. Another unique option provided by applicants' invention is an audio or audio/video intercom between the fueling position and one of the local or remote servers. The intercom provides an audible (and visual) interface between a station operator or other individual. The intercom is especially useful with order entry.

The invention is preferably implemented in a dispenser having a processor, operating system and graphical user interface running a hypertext transfer protocol (HTTP) compliant browser. Each fueling station at each dispenser allows a customer to browse the Worldwide Web of the Internet to the extent desired by the station operator. In short, the fueling position acts as a hypertext markup language (HTML) compliant client with a graphical user interface and browser.

HTTP is a known application protocol that provides users access to files using the standard page description language known as HTML. The HTTP provides tremendous flexibility in accessing files in and including different formats, such as text, graphics, images, sound and video. HTML provides basic document formatting and allows a developer to specify "links" to and between any combination of local and remote servers as well as files therein. Use of a HTML compliant client browser involves specification of a link via a uniform resource locator (URL). Once a link is specified, the client makes a request to the identified server and receives a document formatted according to HTML. These documents are often referred to as "web pages". For more details on HTML and its specific implementation, the *HTML Reference Manuals* published by Sandia National Laboratories and available on the Internet at http://www.sandia.gov/sci_compute/html-.ref.html, is incorporated herein by reference.

DETAILED DESCRIPTION OF THE PREFERRED EMBODIMENT

Figure 1:
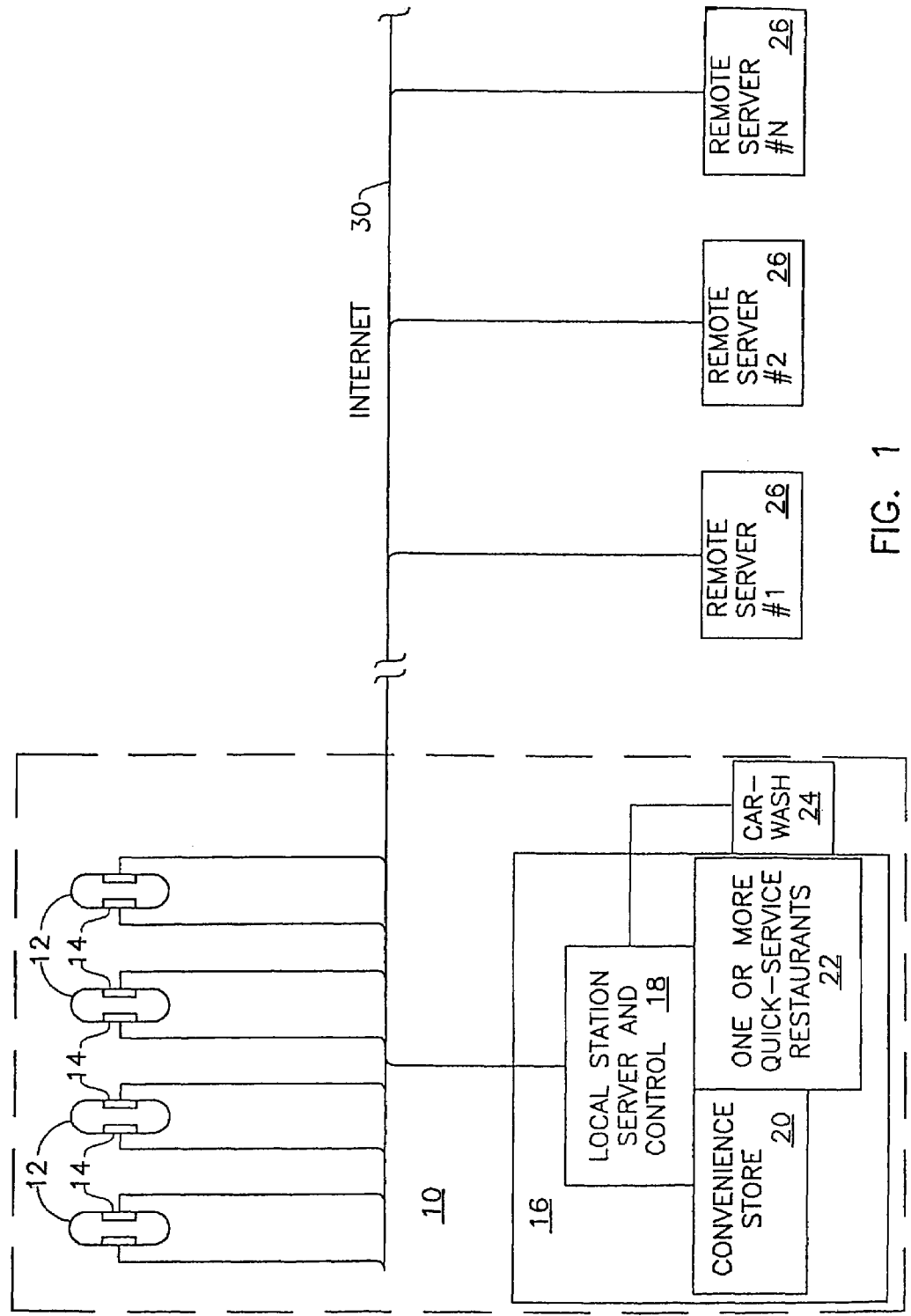
FIG. 1 is a diagram of a fuel station store having dispensers and a local station server connected to the Internet according to the present invention.

Referring now to the drawings in general, and FIG. 1 in particular, it will be understood that the illustrations are provided to describe a preferred embodiment of the invention and are not intended to limit the invention thereto. A fuel station environment 10 is shown having a plurality of fuel dispensers 12. Each fuel dispenser 12 is mounted in conventional fashion at a fixed location in the fuel station environment and typically has at least two fueling positions 14 capable of delivering fuel and providing a point-of-sale (POS) interface.

Figure 3:
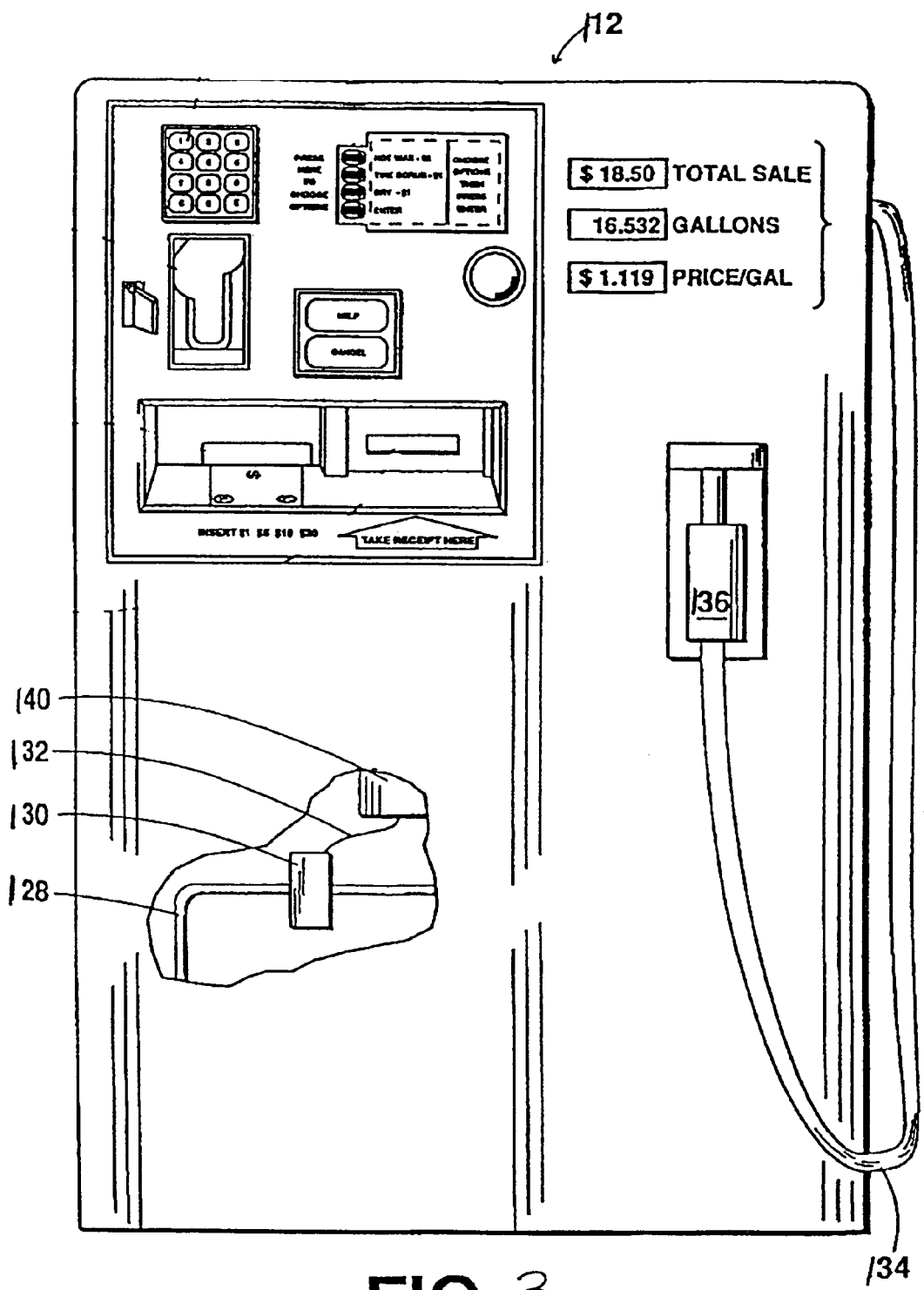
FIG. 3 is an elevation view, partially broken away of a fuel dispenser according to the invention.

As seen in FIG. 3, a fuel dispenser housing 12 is provided with conventional fuel supply line 128, metering device 130, outlet hose 134 and nozzle 136. The metering device 130 communicates data about the volume of fuel dispensed along line 132 to a transaction computer 140.

The dispensers include the normal fuel delivery hardware required to deliver fuel to a customer in a controlled manner, such as pumps, flow control valves, nozzles, hoses 4 and control electronics. A main service station store 16 is operably connected to each dispenser 12 and fueling position 14 in addition to a local station server and control system 18. The server and control system 18 are operationally associated with POS systems and/or transaction systems for a convenience store 20 and one or more quick service restaurants 22, an associated car wash 24 or other service provider. In the preferred embodiment, a customer at any of the fueling positions 14 of any of the dispensers 12 may access the local station server 18 or any number of remote servers 26, which are located outside of the fuel station environment 10, via the Internet or similar network 30. The dispenser may have a direct Internet connection and/or a direct interactive connection to the local server 18.

Figure 2:
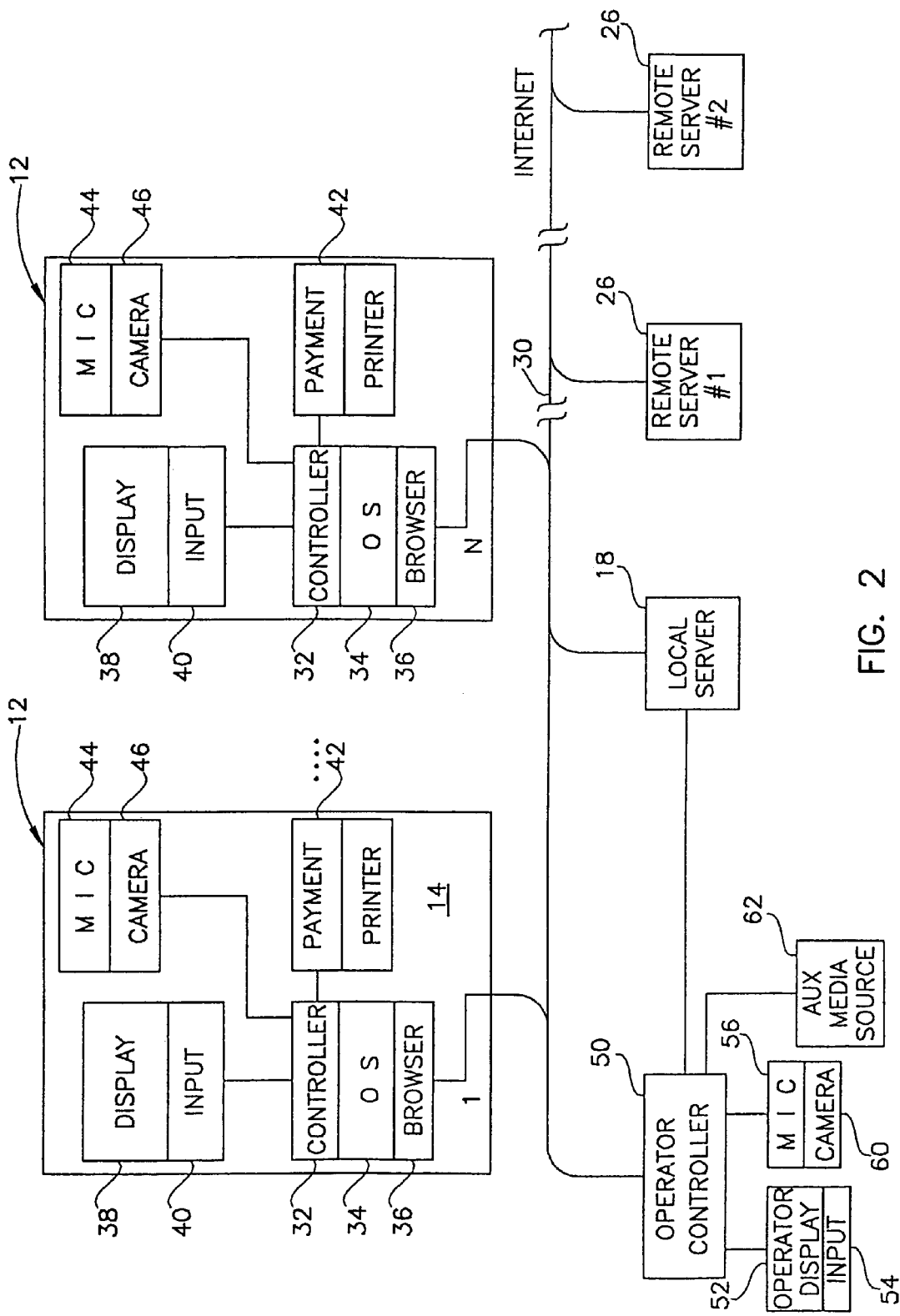
FIG. 2 is a schematic of the fuel dispensing system architecture of the system of FIG. 1.

Turning now to FIG. 2, a fueling position 14 for each dispenser 12 is shown in greater detail. Each fueling position is associated with a controller 32, operating system 34, browser 36, display 38 and input device 40, such as a keyboard, touch pad or touch screen. The display 38 and input device 40 in conjunction with the controller 32, provide a graphical user interface for each fueling position 14. The operating system 34 is adapted to run any number of software applications required to operate the dispenser, graphical user interface and the network browser 36. In more advanced embodiments, each fueling position 14 may include a payment accepting device 42, such as a magnetic strip card reader, smart card reader, or currency acceptor, in addition to a microphone 44 and camera 46 to provide an audio or audio/video intercom with a similarly equipped server or system. Other payment systems may be substituted.

Each graphical user interface may include its own control system or operate in conjunction with a single control system adapted to operate both interfaces on a single dispenser 12. In a preferred configuration of the invention, each fueling position 14 acts as a thin client capable of interacting with a network of servers. The controller 32 and associated user interfaces are preferably designed to minimize the hardware commitment necessary at each dispenser, while having sufficient capability to establish interactivity with the user and provide fuel dispenser control. Most computer intensive functions are provided as services from the various local and remote servers 18, 26. Merchandising and business rule interpretation are handled in the systems nomenclature as services. Although certain functions and services may be run at the dispenser, most functions dealing with customer transactions, information dissemination and advertising or merchandising are preferably performed as services performed remotely and accessed by a client (fueling position). The browser software for each client has the ability to request services either locally or remotely, via the Internet or similar network. Certain services may be automatically requested by the browser at each client, while others await responses by a customer.

The local server and control system 18 will preferably include or be associated with a central operator controller 50. The operator controller 50 may act as the local server 18 or, in the alternative, may operate in association with a separate local server 18. The controller 50 is typically a central site controller used to interface and control pump operation, certain dispenser and store transactions as well as general control of the fuel station store. The controller 50 may also facilitate station operator interaction with the client through an operator display 52 and operator input 54. The local server preferably controls interactivity with the network 30 and/or the dispensers 12.

The audio or audio/video intercom system may include an operator microphone 56 and camera 60. Thus, a station operator may interact with a customer with a combination of text, graphics or audio/video intercom. The controller 50 may include audio and video signal processing capabilities for intercom functions. Furthermore, an auxiliary media source 62 associated with the local server 18 may provide video advertisements, interactive merchandising and promotion, as well as interactive information dissemination. The media source 62 may include media sources such as CDs, laser discs, DVDs (digital video disc), streamed audio or video over the Internet or any other suitable media source. Notably, all of the activities may also be provided remotely through network 30.

The basic system architecture is a network connecting the dispensers 12 and the local station server 18. Each fueling position 14 is treated as a client capable of accessing services provided by the local server 18. Interactivity between the fueling positions 14 and the local station server 18 is accomplished in a manner similar to the way interactivity is accomplished on the Internet, and preferably, identical to the manner in which interactivity is accomplished on the Internet. The system preferably uses HTML and HTML compliant components, media players and services. For local services, each client uses the respective browser 36 to request services from the local station server 18. The graphical user interface is configured to provide easy operation and allow customers to intuitively select the various options presented and receive information, products or services accordingly. The requested services will control the dispenser and its display content as desired and will react to further customer actions to facilitate interactivity. For external services, the client connects to remote services outside the local service station 10 using the same browser interface.

When accessing remote servers on the Internet, the system architecture uses the hypertext mark-up language (HTML). The Internet is a known computer network based on the client-server model. Basically, the Internet comprises a large network of servers accessible by clients. Each of the clients operates a browser, which is a known software tool used to access servers through Internet access providers. A server operates a "web site" which supports files in the form of documents and pages. A network path to a server is identified by a uniform resource locator (URL) having a known syntax for defining a network connection.

The Worldwide Web is that collection of servers of the Internet that utilize the hypertext transfer protocol (HTTP). HTTP is a known application protocol that provides users access to files, which can be in different formats such as text, graphics, images, sound and video, using a standard page description language known as hypertext mark-up language (HTML). HTML provides basic document formatting and allows the developer to specify links to other servers and files therein. Use of an HTML compliant client browser involves specification of a link via the URL. Upon such specification, the client makes a request to the server identified in the link and receives a web page, basically, a document formatted according to HTML, in return. HTML provides exceptional freedom in creating graphics/text/graphic images and associated audio between servers and clients. HTTP and HTML allow complex services to be accessed by clients having a minimum amount of hardware sophistication. The primary computational horsepower is reserved for the servers providing the requested services.

With the described embodiment, making interactive video/graphic presentations to a customer and offering the customer selections for services and merchandise is possible without extensive computational power at each dispenser and fueling position. When the network connecting the local server 18 with the dispensers 12 is connected to a larger network 30, such as the Internet, a tremendous increase in the number of services and functions provided to the customers is provided. The customer may interact with services outside of the local environment as well as increase the functionality of the local environment. Local services are enhanced by making it easier to provide local advertising and merchandising at each fueling position 14. These services are easily customized by those familiar with HTTP and HTML.

Enhanced graphics and customer interaction need only be provided to the local server 18, and customers at each fueling position 14 may access the information through the browser 36. Downloading or updating each fueling position is no longer required. The Internet will provide world wide access to services, such as advertising and merchandising, that would be too costly or impossible to reproduce within the confines of traditional service stations. Local station operators are no longer required to physically incorporate advertising or merchandising within their systems. The local system operator need only provide links to Internet services providing merchandising, advertising or information as desired. Notably, upgrades to the client's software are available online from a remote server or the host.

Preferably, almost all local functions are provided as services by either the local server 18 or one of the remote servers 26. Even the local server 18 may be remote from the dispensers or fueling environment. Local services may include such activities as dispenser pumping and transaction control and order entry of fast food and audio/video displays. Literally hundreds of sites may have fueling operations and numerous other functions running on a remote server. Major fuel companies may provide customized or generic services for each fuel station through the Internet or by periodically releasing information or services on a medium for use with the auxiliary media source 62, such as a periodically released CD or DVD. Additionally, local stations may customize their own services and information dissemination capabilities using similar techniques. For example, local stations may contract with a web page designer to develop a web page which is automatically accessed at the beginning of or during a fueling transaction. Additionally, actual transaction programs may be run on remote servers controlling hundreds of sites having compatible dispensers. Although adapting the dispenser to be a thin client is preferred, a more hardware and software intensive "fat client" may be used with the system and benefit from connectivity to the various local and remote services.

In operation, the graphical user interface can provide the customer with a variety of advertising or information. To facilitate merchandising, the customer is provided the opportunity to order or receive more information about various products or services offered to them by the local server or any number of remote servers. With respect to local services, the customer may order various goods or products in the station store or at one of the restaurants within the station store. Similarly, services outside the station but within the local fueling environment, such as car washes, may be ordered. At any time throughout the fueling operation, advertising may be presented to the customer that encourages the customer to order the goods or services being advertised. Furthermore, local information may be provided to the customer as desired. The customer is provided multiple choices in which to select goods, services or information as desired.

With regard to remote services, local customers may be given the opportunity to order goods or services unavailable at the local station store, such as movie tickets. This is particularly useful for dispensers equipped with printers that can print the movie ticket or other printed items. Furthermore, the customer may download information, such as the weather, traffic conditions, news reports or local maps. Having access to remote services also allows the station owner to run remote advertising campaigns at each fueling position. For example, the browser at each client may automatically access one of these remote servers or preferably, the client may be configured to automatically access the local server 18 which provides a link to the desired remote services. Accessing the local server 18 and linking to remote services minimizes the amount of customization required at each dispenser and fueling position.

Certain modifications and improvements will occur to those skilled in the art upon reading the foregoing description. It should be understood that applicants' invention provides a fuel delivery system architecture where each fueling position is viewed as a client having a graphical user interface capable of accessing services from a local station server, and preferably, remote network servers as well. Although the system is not limited to the Internet and HTML-compliant systems, the architecture depends on minimizing the hardware commitment at each client while providing high quality audio/video/graphic interfaces at these clients using a server capable of carrying the primary computational load. It should be understood that all modifications and improvements to the disclosed system have been deleted herein for the sake of conciseness and readability, but are properly within the scope of the accompanying claims.

We claim:

1. A method of providing an interactive fueling operation comprising:
    providing an interactive graphical user interface at a fixed-location fueling position on a fuel dispenser;
    executing a web browser as a thin client on said interactive graphical user interface;
    displaying information to a customer at the graphical user interface in response to receipt of a markup language from a server spaced from the fuel dispenser, by delivery over a network;
    prompting the customer to select a service with the displayed information;
    receiving a response from the customer identifying a selected service to be provided by the server;
    transferring the response from the dispenser to the server over the network; and
    transmitting the selected service from the server over the network to the fixed-location fueling position based on the customer response at the fixed-location fueling position.

2. The method of claim 1 wherein the delivery transfer and transmission are over the Internet.

3. The method of claim 1 wherein the information displayed is advertising information.

4. The method of claim 1 wherein the information displayed is one of the group consisting of news, weather, sports, traffic updates and maps.

5. The method of claim 1 wherein the information displayed is merchandising information providing the customer an opportunity to select from one or more items displayed.

6. The method of claim 1 wherein the information displayed is live video information of a person communicating with the customer to provide a video intercom.

7. The method of claim 1 further including using hypertext markup language and hypertext transfer protocol to carryout the steps of displaying, prompting, receiving, transferring and providing.

8. A method of providing an interactive fueling operation comprising:
    providing an interactive graphical user interface at a fixed-location fueling position on a fuel dispenser;
    executing a web browser as a thin client on said interactive graphical user interface;
    displaying information to a customer at the graphical user interface from a data source by interpreting a markup language received from said data source;
    prompting the customer to select a service with the displayed information;
    receiving a response from the customer identifying a selected service to be provided;
    transferring the response from the dispenser; and
    transmitting the selected service to the fixed-location fueling position based on the customer response at the fixed-location fueling position.

9. The method of claim 8 wherein the delivery transfer and transmission are over the Internet.

10. The method of claim 8 wherein the information displayed is advertising information.

11. The method of claim 8 wherein the information displayed is one of the group consisting of news, weather, sports, traffic updates and maps.

12. The method of claim 8 wherein the information displayed is merchandising information providing the customer an opportunity to select from one or more items displayed.

13. The method of claim 8 wherein the information displayed is live video information of a person communicating with the customer to provide a video intercom.

14. The method of claim 8 further including using hypertext markup language and hypertext transfer protocol to carryout the steps of displaying, prompting, receiving, transferring and providing.

15. The method of claim 8 wherein displaying information to the customer comprises displaying information through the web browser.

16. The method of claim 1 wherein displaying information to the customer comprises displaying information through the web browser.

17. A method of providing an interactive fueling operation comprising:
    providing an interactive graphical user interface at a fixed-location fueling position on a fuel dispenser;
    executing a web browser as a thin client on said interactive graphical user interface;

displaying information to a customer at the graphical user interface in response to receipt of a markup language from a server spaced from the fuel dispenser, by delivery over a network;

prompting the customer to select a service with the displayed information;

receiving a response from the customer identifying a selected service to be provided by the server;

transferring the response from the dispenser to the server over the network; and receiving, at the fixed-location fueling position, the selected service from the server over the network based on the customer response at the fixed-location fueling position.

* * * * *